United States Patent [19]
Gustafson

[11] Patent Number: 5,914,834
[45] Date of Patent: Jun. 22, 1999

[54] HEAD SUSPENSION ASSEMBLY WITH ELECTRICAL INTERCONNECT BY SLIDER BOND PADS AND GIMBAL BONDING ZONES

[75] Inventor: Gary E. Gustafson, Darwin, Minn.

[73] Assignee: Hutchinson Technology, Inc., Hutchinson, Minn.

[21] Appl. No.: 08/902,865

[22] Filed: Jul. 30, 1997

Related U.S. Application Data

[63] Continuation of application No. 08/668,423, Jun. 17, 1996, abandoned.

[51] Int. Cl.⁶ .................................. G11B 5/48; G11B 5/60
[52] U.S. Cl. ............................................... 360/104; 360/103
[58] Field of Search ..................... 360/103–106, 360/108

[56] References Cited

U.S. PATENT DOCUMENTS

| | | | |
|---|---|---|---|
| 4,761,699 | 8/1988 | Ainslie et al. | 360/104 |
| 4,789,914 | 12/1988 | Ainslie et al. | 360/103 |
| 4,975,795 | 12/1990 | Spash | 360/104 |
| 4,996,623 | 2/1991 | Erpelding et al. | 360/104 |
| 5,001,583 | 3/1991 | Matsuzaki | 360/104 |
| 5,313,355 | 5/1994 | Hagen | 360/104 |
| 5,331,489 | 7/1994 | Johnson et al. | 360/104 |
| 5,391,842 | 2/1995 | Bennin et al. | 360/104 |
| 5,392,179 | 2/1995 | Sendoda | 360/104 |
| 5,428,490 | 6/1995 | Hagen | 360/104 |
| 5,434,731 | 7/1995 | Hagen | 360/104 |
| 5,491,597 | 2/1996 | Bennin et al. | 360/104 |
| 5,530,604 | 6/1996 | Pattanaik | 360/104 |
| 5,570,249 | 10/1996 | Aoyagi et al. | 360/104 |
| 5,737,152 | 4/1998 | Balakrishnan | 360/104 |
| 5,754,368 | 5/1998 | Shiraishi et al. | 360/104 |
| 5,771,138 | 6/1998 | Zarouri et al. | 360/104 |
| 5,781,378 | 7/1998 | Heitkamp et al. | 360/104 |

FOREIGN PATENT DOCUMENTS

| | | | |
|---|---|---|---|
| 52-8814 | 1/1977 | Japan | 360/104 |
| 56-83870 | 7/1981 | Japan | 360/104 |
| 3-248308 | 11/1991 | Japan | 360/104 |
| 4-134611 | 5/1992 | Japan | 360/104 |
| 5-182143 | 7/1993 | Japan | 360/104 |
| 2193833 | 2/1988 | United Kingdom | 360/104 |

OTHER PUBLICATIONS

"Compatibility of Silicon Planar Heads with conventional Thin Film Heads in Hard Disk Drives", IEEE Transactions on Magnetics, vol. 28, No. 5, Sep. 1992, pp. 2124–2126.

*Primary Examiner*—Jefferson Evans
*Attorney, Agent, or Firm*—Faegre & Benson, LLP

[57] ABSTRACT

A head gimbal assembly allows a simplified, automatable electrical interconnection from the read/write head slider to the head suspension assembly electrical interconnect. The head suspension assembly is constructed as a laminated structure. Using a read/write head slider with electrical bond pads on an upper horizontal surface (i.e, the head slider surface bonded to the head suspension assembly and opposite to the disk-confronting head slider surface), electrical interconnection to bonding zones on the upper horizontal surface of the gimbal region is established using standard automated or semi-automated wire bond tooling technology.

15 Claims, 6 Drawing Sheets

HEAD SUSPENSION ASSEMBLY WITH ELECTRICAL INTERCONNECT BY SLIDER BOND PADS AND GIMBAL BONDING ZONES

The present Application is a Continuation of U.S. Ser. No. 08/668,423 filed Jun. 17, 1996, now abandoned.

FIELD OF THE INVENTION

The present invention is an improved head gimbal assembly, which allows a simplified, automatable electrical interconnection from a read/write head slider to an electrical interconnect of a head suspension assembly. Using read/write head sliders with electrical bond pads on an upper horizontal surface (i.e, the head slider surface bonded to the head suspension assembly and opposite to the disk-confronting head slider surface), electrical interconnection to bonding zones on an upper horizontal surface of the gimbal region of the head suspension assembly of this invention is established using standard automated or semi-automated wire bond tooling technology. The head suspension assembly of this invention is preferably constructed in accordance with the description of the laminated structures for a disk drive head suspension assembly given in co-pending commonly assigned U.S. Ser. No. 08/249,117, filed May 25, 1994, now U.S. Pat. No. 5,839,193.

BACKGROUND OF THE INVENTION

Head suspension assemblies are spring structures in disk drives that position a head assembly in read/write relationship to the surface of a rapidly spinning disk or similar data storage device. The head suspension assembly presses the head toward the disk surface with a precise force applied in a predetermined location. The head assembly "flies" over the disk surface at a height established by equilibrium between the downward force of the head suspension assembly and the lift force of the air stream generated by the spinning disk.

A head suspension assembly (HSA) includes the head suspension assembly, the head assembly, and an interconnect assembly. The interconnect assembly includes transmission elements to transmit data to and from the head assembly. HSA's are used in magnetic hard disk drives, the most common type today, or other types of drives such as optical disk drives.

The head suspension assembly includes two spring structures, a load beam and a gimbal, each a balanced combination of rigid regions and flexible spring regions. The load beam is a resilient member designed to provide lateral stiffness and to apply the necessary load on the head assembly. The gimbal is a spring at the distal end of the head suspension assembly and of the load beam. The purpose of the gimbal is to hold the head assembly at an appropriate orientation and at a constant distance over the disk, even as the load beam flexes and twists. The head assembly is attached to the gimbal and includes a read/write transducer or head attached to an air bearing head slider. The head assembly also includes electrical terminals for interconnection to the interconnect assembly for receiving and relaying read and write signals.

The head suspension assembly is attached at its proximal end either directly or by means of a rigid arm to a linear or rotary motion actuator. The actuator rapidly moves (and then abruptly stops) the HSA, positioning the head assembly over any position on the disk. The closer the head assembly can fly to the surface of the magnetic disk, the more densely information can be stored on the d:Lsk. However, the head assembly must not touch the disk ("crash"), since impact with the spinning disk can potentially destroy the head, the surface of the disk, and the stored data.

Amplifying and control electronic circuits process, send, and receive the data signals to and from the head assembly. Traditional head assemblies complete a read/write circuit loop with two conductors, usually copper wires encapsulated in a plastic sheath. Newer magneto-resistance head assemblies require four or more independent conductors. The interconnect assembly includes the conductors and accompanying insulators and connectors.

Traditional hand mounting and placement of electrical conductors and their connections between the interconnect assembly and the read/write head slider is imprecise and costly. Accurate placement of electrical conductors and their connections is especially critical in the delicate gimbal region. As the industry transitions to smaller head slider/transducer sizes to increase data storage density, limitations of the current electrical interconnecting technology increase the potential for read/write errors and impose ceilings on data storage density.

Using present interconnect technology, two to five lengths of wire are hand bonded to the head assembly. The lengths of wire are typically shaped by hand to form a service loop between the head assembly and the head suspension assembly and to position the wire along a predetermined wire path on the head suspension assembly. Precise formation of the service loop is required. Too tight of a service loop places an unwanted torque on the head slider and can cause flying attitude errors. Too loose of a service loop might allow the wire to interfere with the spinning disk. Moreover, throughout the process of handling the head slider and wires there is a risk of damaging the wires or the delicate load beam and gimbal.

DESCRIPTION OF RELATED ART

Co-pending commonly assigned U.S. Ser. No. 08/249,117 describes laminate structures for use in head suspension assemblies (HSAs). Those laminate structures integrate manufacture of the electrical interconnect assembly with that of the head suspension assembly, so that manual handling of conductors is eliminated. Since the head suspension assembly and interconnect assembly are manufactured together, variability of the alignment of the components is minimal and conductor geometry is always precise.

The laminate sheet, from which the laminate structures are manufactured, comprises a first layer of a metal spring material, an intermediate second layer of an electrically insulating (preferably adhesive) material, and a third layer of an electrically conductive material. The second layer only provides minimal spring or structural characteristics to the laminate structure as a whole. The first layer can be of stainless steel. The second layer can be a thin layer of polyimide. The third layer can be a conductive spring material, such as beryllium copper, BeCu.

The first layer is formed by chemical etching into a spring element. The third layer is similarly formed into at least one trace, the trace including at least one elongated conductor configured for electrical coupling to a head assembly. As described, the second layer, as a result of etch forming of the first and third layers, remains in the areas of overlap between the first and the third layers.

Interconnect-suspension assemblies include an interconnect assembly and a head suspension assembly including a gimbal and a load beam having a rigid region and a spring region. The gimbal can be formed out of the first layer, the third layer, or both. The spring region of the load beam can also be formed out of either or both layers.

The first layer has a load beam element including a rigid region. The third layer has at least one trace for electrical coupling to the head assembly, each trace including a gimbal region at a distal end portion and a load beam region at a proximal end portion. The gimbal region is preferably shaped as a gimbal spring arm. The second layer has at least one panel, the panels sandwiched between overlapping areas of the first and third layers.

SUMMARY OF THE INVENTION

A disk drive head suspension assembly, according to the present invention, is designed and adapted for use in connection with a head slider which has a gimbal-mounting surface, with slider bond pads on the gimbal-mounting surface. The head suspension assembly comprises a load beam, with a gimbal on the distal end of the load beam and electrical conductors on the load beam, which extend to gimbal bond pads. The load beam has proximal and distal ends. The gimbal includes a mounting platform and slider bond pad access openings adjacent to the mounting platform. The gimbal bond pads are provided on the mounting platform. The head suspension assembly is preferably constructed as a three-layer laminate structure, according to the disclosure of U.S. Ser. No. 08/249,117, filed May 25, 1994.

The mounting platform of the gimbal has first and second surfaces. The first surface of the mounting platform is configured to be mounted to the gimbal mounting surface of the head slider. The slider bond pad access openings of the gimbal are adjacent to the mounting platform. By this arrangement, the bond pads on the head slider can be positioned to enable access to the slider bond pads when the head slider is mounted to the first surface of the mounting platform. The bond pads on the gimbal are positioned on the second surface of the mounting platform and adjacent to the slider bond pad access openings. Thus, the slider bond pads and the gimbal bond pads can be located next to one another and facing the same direction. Then, connecting wires can connect the gimbal bond pads to the slider bond pads from the same side. Electrical conductors are provided on the load beam which extend to the gimbal bond pads.

DETAILED DESCRIPTION OF THE PREFERRED EMBODIMENT

Figure 1:
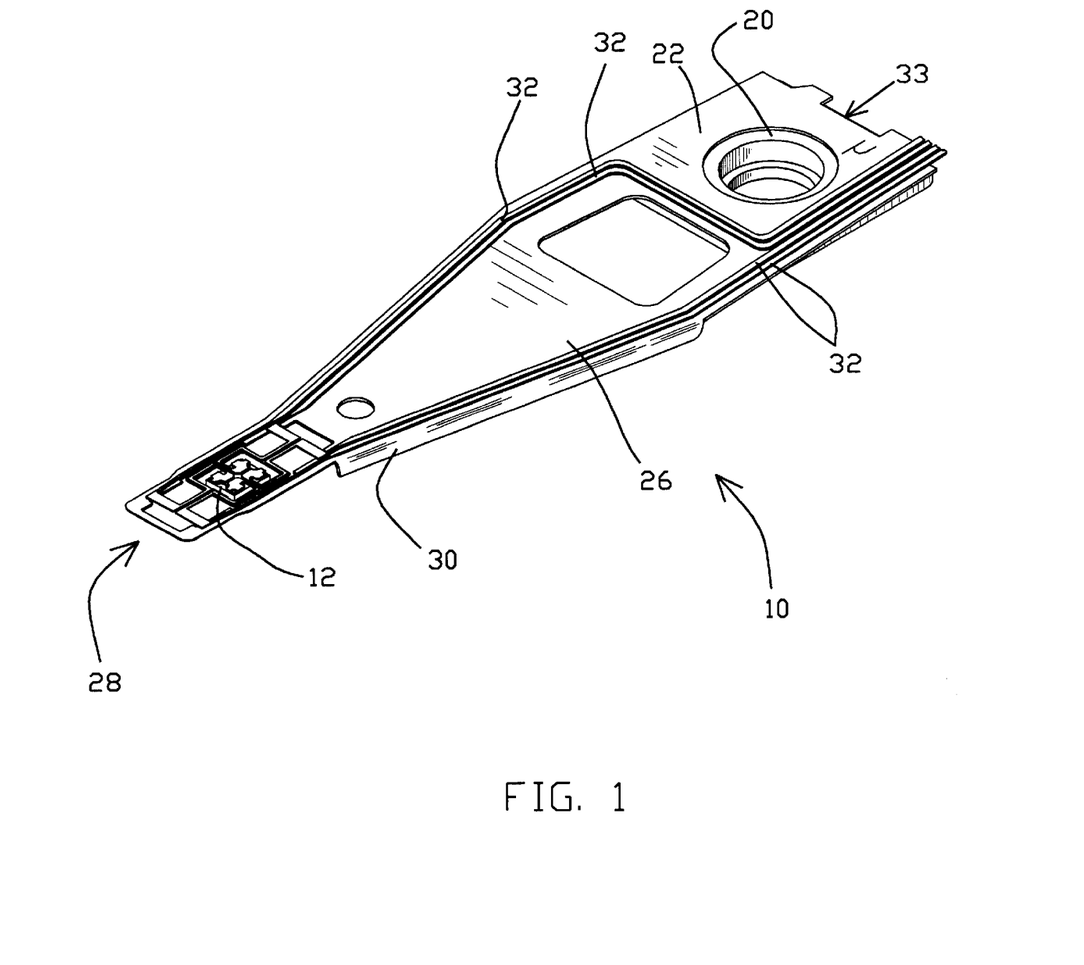
FIG. 1 is an isometric view of a head suspension assembly according to the present invention, in which the gimbal region is arranged for wire bonding electrical attachment to bond regions on the head slider surface attached to the gimbal region.
Figure 2:
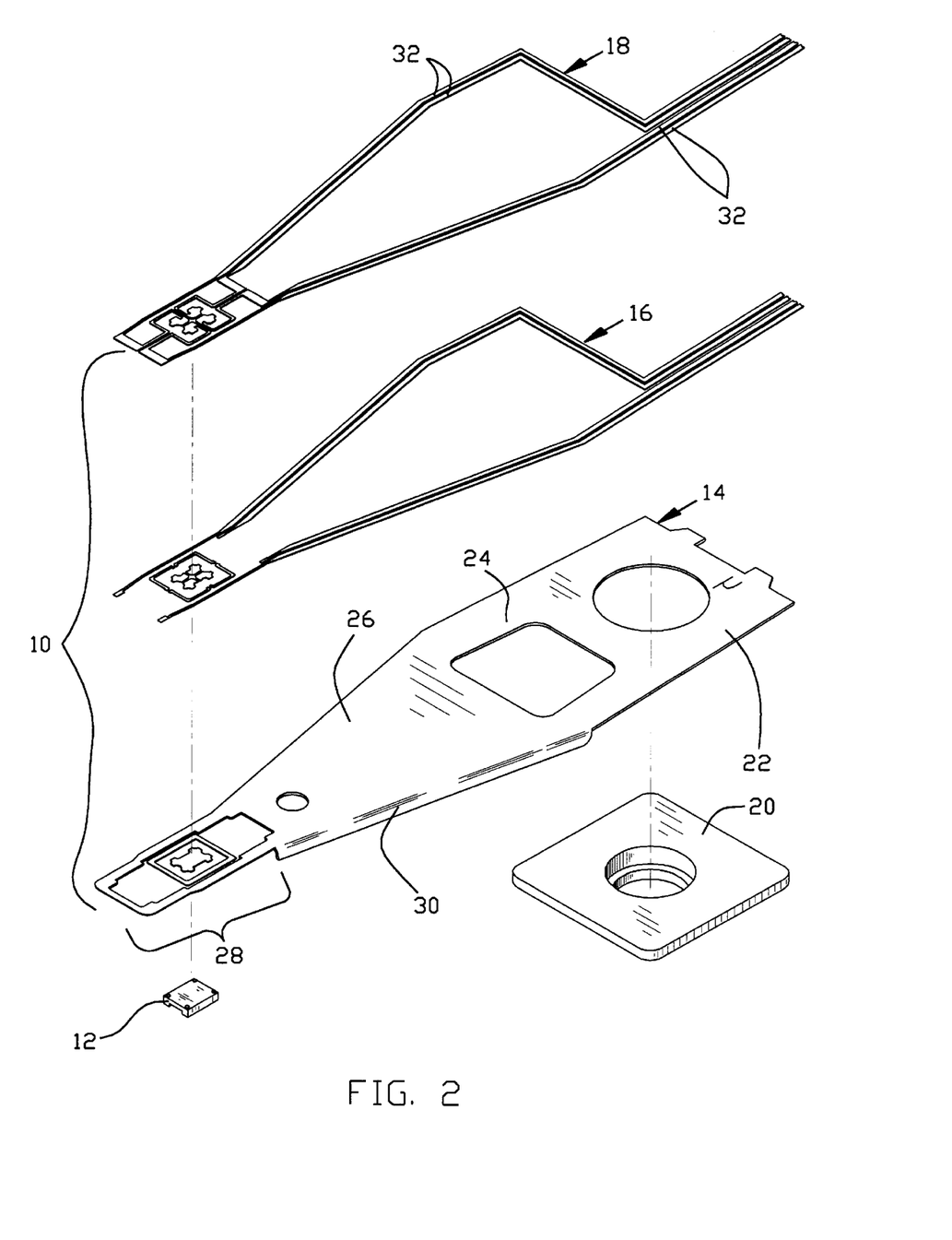
FIG. 2 shows the head suspension assembly of FIG. 1 in an exploded isometric view.

Referring now to the figures, wherein like components are designated with like numerals throughout the several figures, and initially to FIGS. 1 and 2, a head suspension assembly 10 is illustrated having an improved electrical interconnect with head slider 12. The head slider 12 is conventionally provided with a magnetic head in a known manner.

In addition to the head slider 12, the head suspension assembly of the present invention comprises a load beam 14, an electrical insulation layer 16, an electrical interconnect layer 18 and a base plate 20. Each of these components are shown separated in the exploded view of FIG. 2 and as assembled in FIG. 1. The load beam 14 is further divided into an actuator mounting region 22, a spring region 24, a rigid region 26 and a gimbal region 28. The base plate 20 is fixed with the actuator mounting region 22, such as by welding, which facilitates the mounting of the head suspension assembly 10 to a rigid arm (not shown) of an actuator, rotary or linear, of a magnetic disk drive. The spring region 24, as is well known, provides a spring force to the gimbal region 28 and thus head slider 12 for counteracting the aerodynamic lift force generated against head slider 12 and establishing the flying height of the head slider 12 The rigid region 26 preferably includes side flanges 30, as known, for increasing the stiffness of the rigid region 26. The gimbal region 28 provides the spring connection between head slider 12 and load beam 14 which permits the head slider 12 to pivot in its pitch and roll directions, but which provides sufficient in-plane stiffness for data tracking. As will be more fully described below, the gimbal region 28 includes components of the material of the load beam 14, the insulating layer 16 and the electrical interconnect layer 18.

Figure 3:
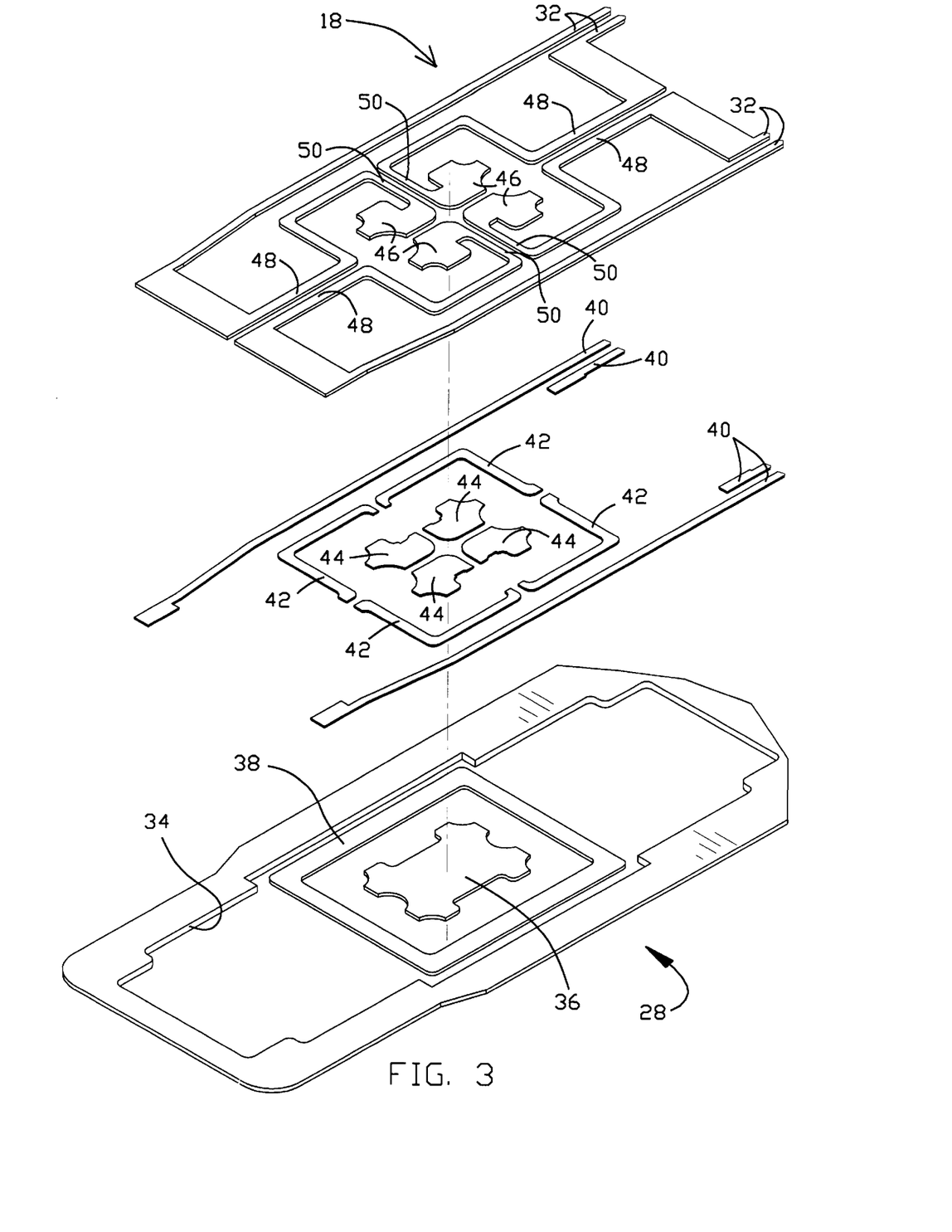
FIG. 3 shows an enlarged view of the gimbal region of FIG. 2.

The electrical interconnect layer 18 provides a number of conductors in the form of traces 32 which are provided onto the surface of load beam 14 with insulating layer 16 therebetween. The traces 32 provide the electrical conductors which run from the proximal end 33 of the head suspension assembly to the gimbal region 28 of the head suspension assembly for providing electrical interconnect from the head slider 12 to the disk drive signal processing and control electronic circuitry (not shown). Preferably, the electrical interconnect layer 18, within its gimbal region, as shown in FIG. 3, also provides a structural part of the gimbal region 28 for supporting the head slider 12 and permitting pitch and roll movements. In this regard, reference is made to copending U.S. patent application Ser. No. 08/249,117, commonly owned by the assignee of the present invention, the complete disclosure of which is hereby incorporated by reference.

As shown in FIG. 3, the gimbal region 28 of the load beam 14 includes an opening 34 within which a mounting platform 36 and a frame 38 are provided. The mounting platform 36 and frame 38 are preferably formed of the same material as the load beam 14. The insulating layer 16 includes trace portions 40 which substantially correspond to the traces 32 of the electrical interconnect layer 18. Within the gimbal region thereof, the insulating layer comprises both frame portions 42 and mounting platform portions 44, the purposes of which will be apparent from the description below.

The electrical interconnect layer 18, in addition to the traces 32, includes portions thereof which provide part of the structural interconnect of the gimbal region and electrical bonding zones 46. The electrical bonding zones 46 are mounted to and provided as a part of the mounting platform 36 with insulation mounting platform portions 44 in between. One of each of the traces 32 connects with one each of the electrical bonding zones 46 of the electrical interconnect layer 18. Preferably, each of the traces 32 include a longitudinal bridge portion 48, and a transverse bridge portion 50. Collectively, the bridge portions 48 and 50 provide the structural capability of the electrical interconnect layer 18 which connects with the mounting platform 36 to provide the gimballing function. Reference is again made to the copending U.S. patent application Ser. No. 08/249,117 for alternative constructions and methods of producing the gimballing region comprised of components of the load beam, insulation layer, and electrical interconnect layer.

Figure 4:
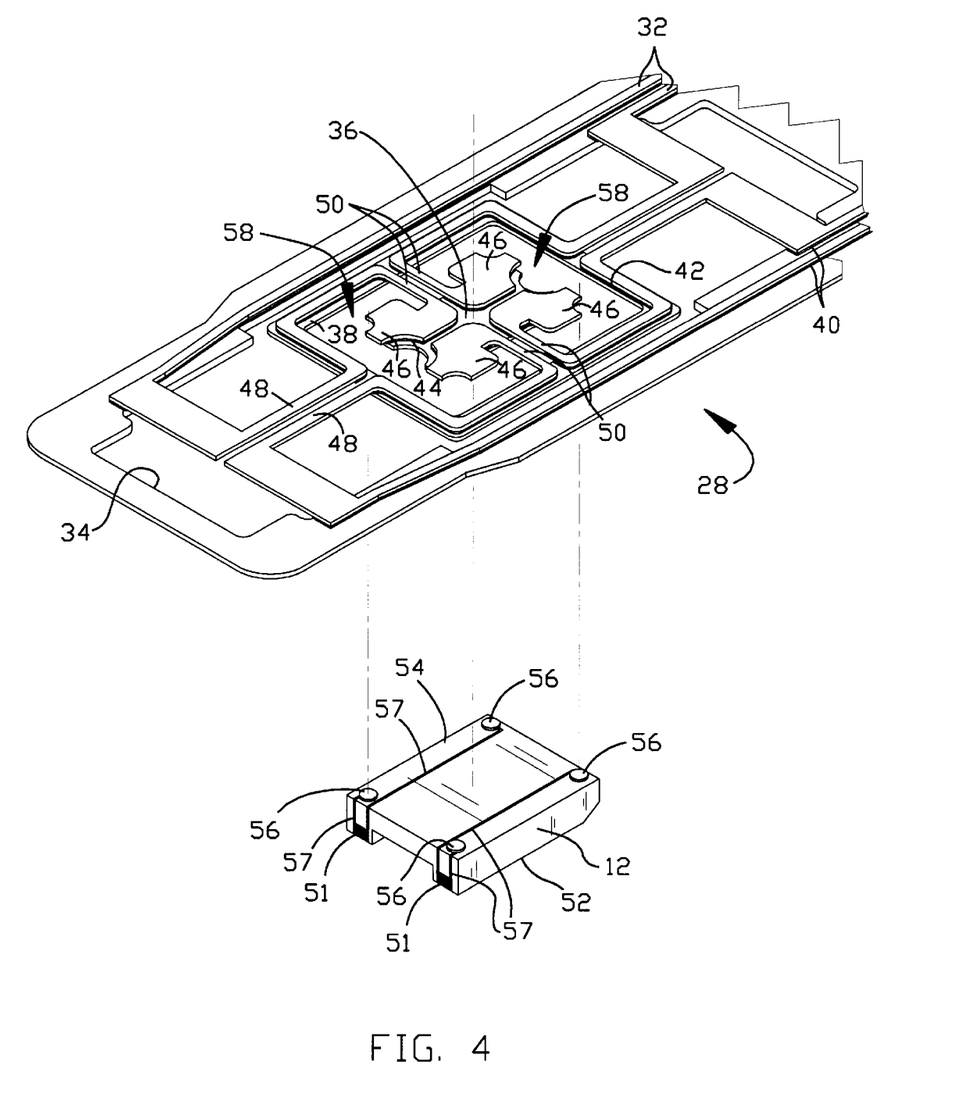
FIG. 4 shows the three layers of the gimbal region of FIG. 3 assembled and with a head slider shown in position for bonding, prior to being assembled to the gimbal region.

With reference to FIG. 4, the gimbal region 28 is shown in its assembled state of the load beam portions comprising the mounting platform 36 and frame 38, the insulation portions comprising trace portions 40, frame portions 42 and mounting platform portions 44, and the electrical interconnect layer 18 comprising traces 32, electrical bonding zones 46, longitudinal bridges 48 and transverse bridges 50. As is apparent from the assembled gimbal region shown in FIG. 4, the insulating layer portions 40, 42 and 44 ensure that each of the traces 32 of the electrical interconnect layer 18 provide a single conductor travelling along the load beam 14 to the mounting platform 36 which are separate and electrically distinct from one another. Head slider 12 is illustrated in position to be assembled to the gimbal region 28, as described below.

The head slider 12, as shown best in FIG. 4, is conventionally configured in that it has a lower disk confronting surface 52, and includes known magnetic heads 51 which are conventionally mounted on a side surface 55 of slider 12 near its edge with surface 52. Moreover, the head slider 12 includes a gimbal mounting surface 54 by which head slider 12 is mounted to the mounting platform 36 of the head suspension assembly 10. Typically, the head slider 12 is mounted to the mounting platform of a head suspension assembly by way of adhesive. In accordance with the present invention, the head slider 12 also includes a number of slider bond pads 56, four of which are shown. The slider bond pads 56 are electrically connected with the heads 51, such as by way of conductive traces 57 provided over the surfaces 55 and 54 of head slider 12, as shown in FIG. 4. The slider bond pads 56 provide electrical connection points of the head slider 12 to the gimbal region 28 of the head suspension assembly 10, specifically to of the electrical bonding zones 46 provided as part of the mounting platform 36.

Any slider having slider bond pads 56 provided on or as an extension of the gimbal mounting surface are contemplated to be usable with the head suspension assembly 10 of the present invention. Included are sliders having electrical conductor elements like traces 57 on the surface of the head slider 12 between each of the slider bond pads 56 and the magnetic head as well as sliders having the electrical conductors provided internally through the head slider between its bond pads and head(s). Preferably, the head sliders 12 are composed of silicon with the bond pads 56 preferably plated with aluminum or gold. Moreover, a metal barrier of titanium-tungsten (TiW) may be provided between the slider bond pads 56 and a gold plate layer as an external surface. Head sliders of the type that may be used or modified to be used in accordance with the present invention are described in, for example, U.S. Pat. No. 4,761,699, issued Aug. 2, 1988, by Ainslie et al.; U.S. Pat. No. 4,789,914, issued Dec. 6, 1988, by Ainslie et al.; and U.S. Pat. No. 5,331,489, issued Jul. 19, 1994, by Johnson et al. Suitable head sliders having bonding pads on the gimbal mounting surface thereof are also commercially available from Seagate Technology, Inc. of Minneapolis, Minn., and from Silmag, of Granoble, France.

As set out in the aforementioned copending U.S. application Ser. No. 08/249,117, which is incorporated herein by reference, the traces 32, electrical bonding zones 46 and bridge portions 48 and 50 of the electrical interconnect layer 18 are preferably composed of a conductive spring material, such as beryllium copper (BeCu). BeCu is preferred because of its excellent mechanical and electrical conductive properties to act as both a conductor and a structure spring element.

The electrical bonding zones 46 of the mounting platform 36 are preferably plated with a gold wire bondable nickel-gold (NiAu) plating. The nickel is generally 1–1.5 micrometers thick, and the gold is generally 0.75–1.25 micrometers thick. Preferably, the nickel plating is provided as a soft nickel plating suitable for forming of the gimbal region and for the bonding procedure. The gold plating is preferably gold cyanide. The NiAu plating preferably coats all exposed edges and surface of the BeCu bonding zones 46. The nickel layer is provided to prevent copper and gold from intermingling, which could lead to latent wire bond failure.

The load beam 14 preferably comprises a spring material, such as stainless steel. The electrically insulating layer 16 preferably comprises a dielectric or insulating material, such as an epoxy or a thermoplastic polyimide adhesive. Each of the layers 14, 16 and 18 are formed and/or patterned into elements for the desired laminate head suspension assembly structure 10. Chemical etching, electro-discharge machine (EDM) laser cutting and other similar methods known in the art may be used. Etching of the layers can be done sequentially or simultaneously. Due to the structural integrity of the laminate construction, thinner materials than those normally used can be successfully processed into the head suspension assembly structures. By etching the laminate structures directly from a sheet laminate, the etched layers are not physically separated from one another during manufacturing or operation.

Figure 5:
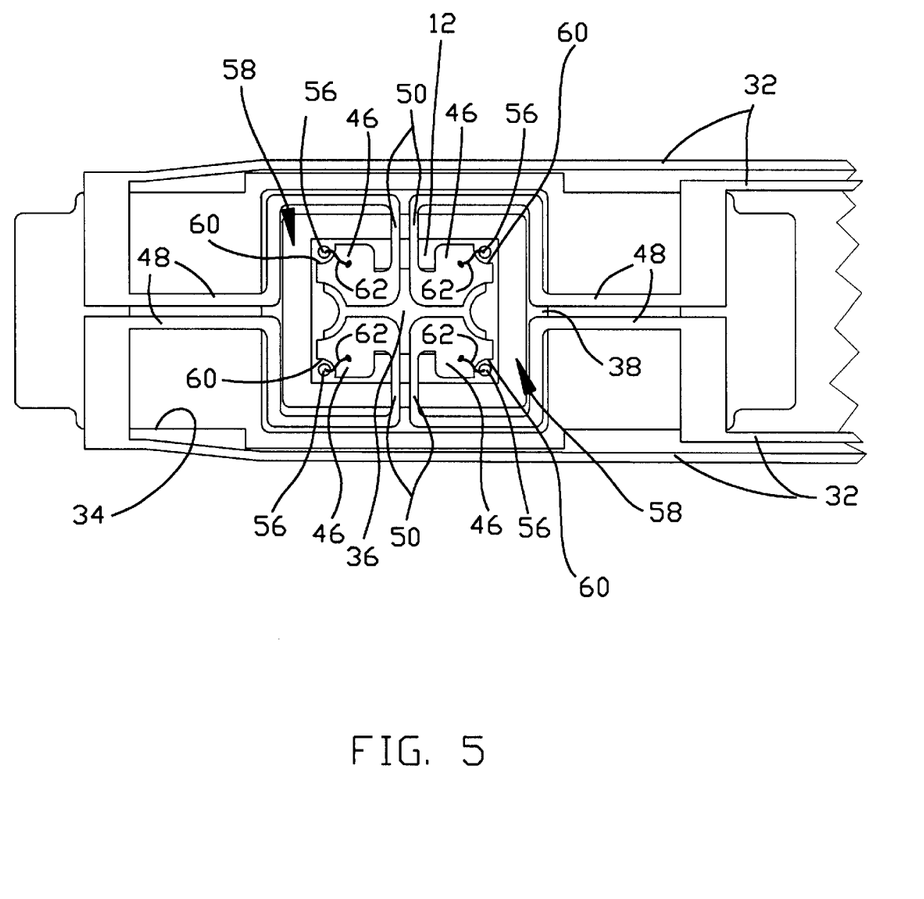
FIG. 5 shows a top plan view of the gimbal region of the assembly of FIG. 1.

As shown in FIG. 5, the electrical bonding zones 46 of the mounting platform 36 are configured so that slider bond pads 56 are positioned adjacent to but in a non-contacting position with the electrical bonding zones 46. More specifically, access openings 58 are defined (see also FIG. 4) between the mounting platform 36 and the portions of traces 32 including transverse bridges 50 connecting the electrical bonding zones 46 to the traces 32 running to the proximal end of the load beam 14. Preferably, each of the electrical bonding zones 46 include an arcuate cutout 60 at a corner of each of them to facilitate the positioning of the slider bond pads 56 in a non-contacting adjacent position.

Then, wires 62 can be connected from the slider bond pads 56 to the electrical bonding zones 46. As can be seen, each slider bond pad is connected by a wire to a different electrical bonding zone 46, each of which is connected with a separate conductor defined by traces 32. By this configuration, each trace 32 of the electrical interconnect layer 18 provides a separate conductor to each one of the slider bond pads 56. It is contemplated that more or less of such bond pads 56 and electrical bonding zones 46 associated with independent traces 32 can be configured depending on the specific application.

Figure 6:
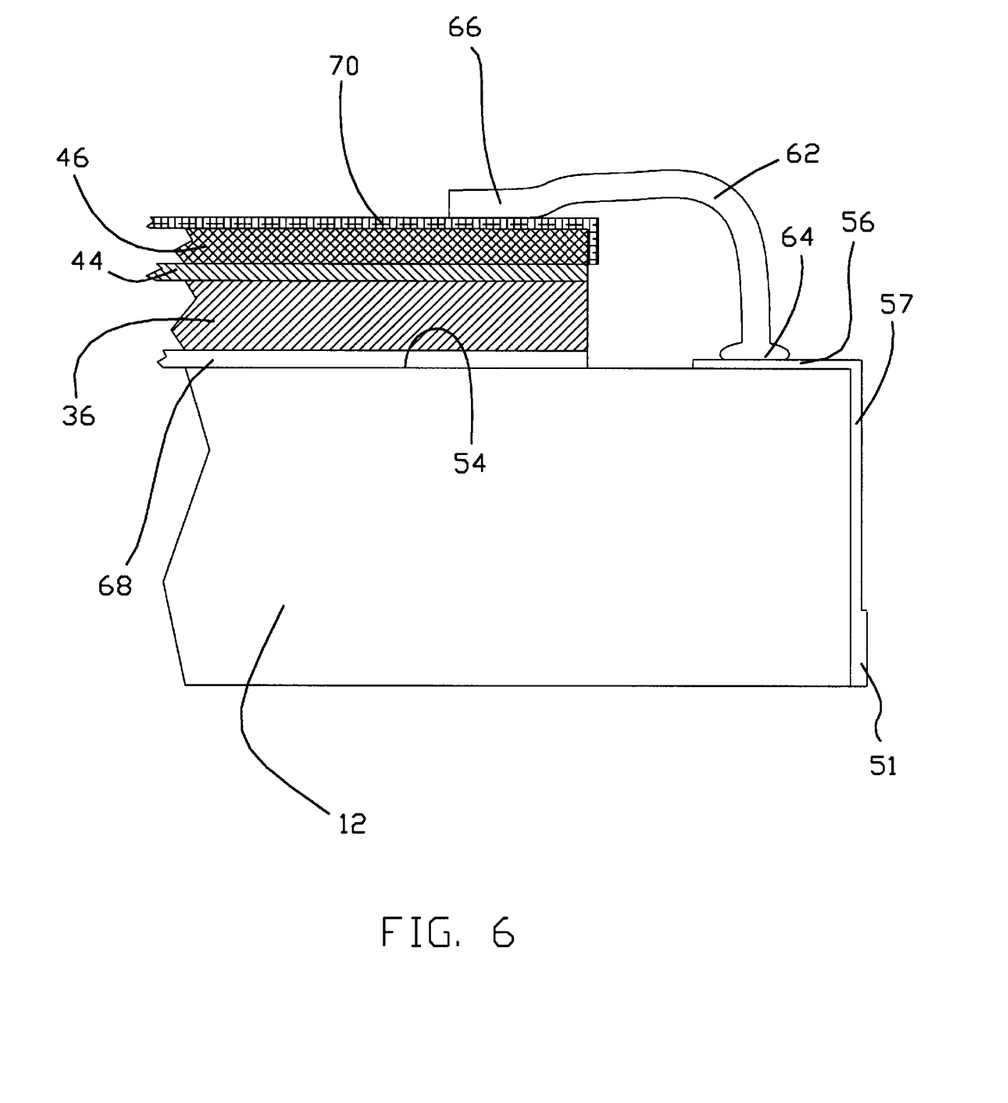
FIG. 6 shows an enlarged side view of a corner of the head slider attached to the gimbal region. The adhesive bond is shown, as well as the wire bond electrical attachment.

As shown in FIG. 6, an aspect of the present invention is that each independent wire 62 is connected from the slider bond pads 56 on the gimbal mounting surface 54 of the head slider 12 as at wire bond 64 and to the similarly facing surface of the electrical bonding zones 46 as at wire bond 66. A significant advantage is that conventional wire bonding techniques can be utilized from the same side of the head suspension assembly 10. In other words, after the head slider 12 is positioned with its bonding pads 56 adjacent the electrical bonding zones 46, the wire 62 can be connected from one side of the head suspension assembly 10 to both the slider bond pads 56 and the electrical bonding zones 46. As shown in the side view of FIG. 6, an adhesive layer 68 is illustrated between the platform 36 and head slider 12, and the electrical bonding zone 46 of the electrical interconnect layer 18 is illustrated with an external gold plating layer 70.

As a modification, the bonding zones 46 and mounting platform 36 may be provided with apertures of through holes (not shown) to allow UV carrying of the adhesive layer 68 for bonding the head slider 12 to the mounting platform 36. Moreover, it is contemplated that such through holes, or those otherwise provided may be utilized instead of the arcuate cutouts 60 to provide the means by which the slider bond pads 56 can be positioned adjacent to but non-contacting with the mounting platform 36.

When the slider bond pads 56 are aluminum and the electrical bonding zones 46 of the gimbal region 28 are nickel-gold, the wire bond interconnection is preferably of gold or aluminum wire.

The present invention allows a simplified electrical interconnection between the read/write head slider 12 and the interconnect layer 18 of a head suspension assembly 10. Using presently available read/write head sliders 12 with electrical bond pads 56 on an upper horizontal surface thereof, electrical interconnection to the bonding zones 46 with the slider bond pads 56 is easily established using standard automated or semi-automated wire bond tooling technology. Since the wire bond connections are made all from the same angle and side to the assembly, the electrical connection process can be easily automated with standard IC wire bond tooling and technology, typically at stitch speeds of 7–10 per second. Since the wire bond process can be easily and reliably automated, it can be conducted at low cost and with a high degree of reliability. Moreover, since the wire conductors are exclusively on the top surface of the head slider (opposite the head sliders disk confronting surface) there is a minimized possibility for damage caused by head lifting operations. The wire bonds themselves are protected from wear by being positioned recessed from the surface of the lead beam and thus serve to minimize the overall height of the head suspension assembly. Additionally, because the bond pad surface of the head slider is adhered to the gimbal mounting platform, there is no wire bond fatigue which might be caused by motion between these two elements and the wire bonds do not contribute to bias torque.

What is claimed is:

1. A head suspension for use with a head slider having a gimbal-mounting surface with slider bond pads on the gimbal-mounting surface, comprising:
   a load beam having proximal and distal ends;
   a gimbal region adjacent the distal end of the load beam, including:
   a mounting platform comprising at least one mounting element having a first surface configured to be mounted to a gimbal-mounting surface of a head slider and an oppositely facing second surface;
   at least one access opening through said gimbal region enabling access from the second surface of the mounting platform to slider bond pads when a head slider is mounted to the first surface of the mounting platform; and
   an electrical bonding zone on the second surface of the mounting platform; and
   an electrical conductor on the load beam extending to the gimbal bonding zone.

2. The head suspension of claim 1 and further in combination with:
   a head slider having a gimbal-engaging surface and at least one slider bond pad on the gimbal-engaging surface, wherein the gimbal-engaging surface is mounted to the first surface of the mounting element of the mounting platform and the slider bond pad extends into the access opening; and a wire bond electrically interconnecting the slider bond pad to the electrical bonding zone.

3. The head suspension of claim 1 wherein:
   the load beam includes a layer of stainless steel;
   the mounting platform of the gimbal region includes a layer of stainless steel; the electrical bonding zone includes a layer of a conductive material providing at least a portion of the second surface of the mounting platform;
   the electrical conductor includes conductive material overlaying the load beam and extending to the gimbal bonding zone; and
   the head suspension further includes insulating material between the stainless steel forming the mounting platform and the conductive material forming the electrical bonding zone, and between the stainless steel forming the load beam and the conductive material forming the electrical conductor.

4. The head suspension of claim 3 wherein peripheral edges of the mounting platform, the electrical bonding zone and the insulating material between the mounting platform and gimbal bonding zone are shaped to form a slider bond pad access aperture that will extend along and adjacent to a peripheral edge of a slider bond pad when a head slider is mounted to the first surface of the mounting platform.

5. The head suspension of claim 4 wherein the peripheral edges of the mounting platform, the electrical bonding zone and the insulating material between the mounting platform and gimbal bonding zone, as a planar perspective, define a concave arcuate portion of the slider bond pad access aperture.

6. The head suspension of claim 1 wherein peripheral edges of the mounting platform and the electrical bonding zone are shaped to form a slider bond pad access aperture that will extend along and adjacent to a peripheral edge of a slider bond pad when a head slider is mounted to the first surface of the mounting platform.

7. The head suspension of claim 6 wherein the peripheral edges of the mounting platform and the electrical bonding zone, as a planar perspective, define a concave arcuate portion of the slider bond pad access aperture.

8. The head suspension of claim 1 wherein:
   the head suspension further includes a gimbal aperture between the load beam and the mounting platform; and
   the electrical conductor includes a gimbal spring arm section extending across the gimbal aperture between the load beam and the mounting platform.

9. The head suspension of claim 8 wherein the mounting platform includes:
   a frame; and
   at least one bonding section within the frame, wherein the slider bond pad access apertures between the bonding section and the frame.

10. The head suspension of claim 1 wherein:
    the load beam includes a layer of stainless steel having a gimbal aperture on the load beam distal end;
    the mounting platform is positioned within the gimbal aperture and includes:

a stainless steel frame; and at least one stainless steel bonding section within the frame;

the electrical bond zone includes a layer of a conductive material providing at least a portion of the second surface of the bonding section;

the electrical conductor includes:

a first spring arm section formed from conductive material and extending between the load beam distal end and the frame of the mounting platform; and a second spring arm section formed from conductive material and extending between the frame of the mounting platform and an electrical bonds zone on the bonding section of the mounting platform; and the head suspension further includes insulating material between the stainless steel forming the bonding section of the mounting platform and the conductive material forming the electrical bonding zone, and between the stainless steel forming the bonding section and the frame of the mounting platform and the portions of the electrical conductor forming the first and second spring arm sections.

11. The head suspension of claim 10 wherein peripheral edges of the mounting platform and the electrical bonding zone are shaped to form a slider bond pad access aperture that will extend along and adjacent to a peripheral edge of a slider bond pad when a head slider is mounted to the first surface of the mounting platform.

12. The head suspension of claim 11 wherein the peripheral edges of the mounting platform and the electrical bonding zone, as a planar perspective, define a concave arcuate portion of the slider bond pad access aperture.

13. The head suspension of claim 10 and further in combination with:

a head slider having a gimbal-engaging surface and at least one slider bond pad on the gimbal-engaging surface, wherein the gimbal-engaging surface is mounted to the first surface of the stainless steel bonding section of the mounting platform and the slider bond pad extends into the slider bond pad access aperture; and a wire bond electrically interconnecting the slider bond pad to the electrical bonding zone.

14. The head suspension of claim 1 wherein the electrical bonding zone on the second surface of the mounting platform is electrically insulated from the first surface of the mounting platform.

15. The head suspension of claim 1 wherein the mounting platform further comprises plural mounting elements, and each mounting platform includes a first surface for mounting to a head slider and a second surface provided with an electrical bonding zone.

* * * * *

UNITED STATES PATENT AND TRADEMARK OFFICE
CERTIFICATE OF CORRECTION

PATENT NO. : 5,914,834
DATED : June 22, 1999
INVENTOR(S) : Gary E. Gustafon

It is certified that error appears in the above-identified patent and that said Letters Patent is hereby corrected as shown below:

Column 8, line 61, change "apertures" to -- aperture is --

Column 9, line 13, delete "bonds" insert -- bonding --

Signed and Sealed this

Sixteenth Day of May, 2000

Attest:

Q. TODD DICKINSON

*Attesting Officer*          *Director of Patents and Trademarks*